BINARY RECORD PHOTOSENSING APPARATUS

Filed Dec. 19, 1962

INVENTOR.
JAMES L. PATTERSON
BY
[signature]
ATTORNEY

United States Patent Office 3,248,553
Patented Apr. 26, 1966

3,248,553

BINARY RECORD PHOTOSENSING APPARATUS

James Lawrence Patterson, San Jose, Calif., assignor to International Business Machines Corporation, New York, N.Y., a corporation of New York Filed Dec. 19, 1962, Ser. No. 245,696
8 Claims. (Cl. 250—219)

The invention relates to optical readout of information recorded in binary form on cards or tapes. It particularly pertains to high speed photosensing with photoconductive devices although the invention is not limited to such devices.

While there are known arrangements for optically reading cards and tapes, and certain features of known photoconducting devices immediately suggest the possibility of adaptation to such photosensing, prior attempts have not been successful, mainly due to the inherently slow decay of the conductance characteristic of the photoconductive devices presently available commercially.

An object of the invention is to take advantage of the small size and low cost of photoconductive devices in photosensing apparatus.

Another object of the invention is to provide a relatively high speed arrangement for sensing cards or tapes in motion with conventional photoconductive devices.

A further object of the invention is to provide a sensing arrangement for sensing data recorded in binary form on conventionally punched or marked cards or tape interchangeably and producing a corresponding electric pulse train by means of commercially available photoconductive devices.

An advantage of the invention is that a direct current circuit readily obtains, thereby eliminating practical problems that would be encountered were alternating current coupling necessary.

A feature of the invention is that maximum pulse widths readily obtain without critically adjusted circuitry.

The foregoing and other objects, features and advantages of the invention are attained in a photosensing arrangement having two photoresponsive devices coupled to a bistable electronic switching circuit for generating an output pulse train corresponding to data indicia borne by a moving carrier in response to propagation of light from a suitable source by way of the indicia (by direct transmission or reflected transmission) borne by the carrier representing the data. The switching circuit is normally stable in a given predetermined initial stable condition of operation and light impinging on one of the photoresponsive devices by way of indicia as the carrier comes within the purview thereof, serves to switch and hold the circuit in the other or reciprocal stable condition. The circuit is restored to the initial stable condition of operation in response to light impinging on the other photoresponsive device as the same indicia comes within the purview thereof. The photoresponsive devices are preferably spaced along the direction of travel of the carrier by a distance equal to the spacing of the indicia thereon.

More specifically, according to the invention, punched cards and paper tape are sensed in an arrangement wherein a suitable lamp is arranged at one side of the path of the carrier and photoconductive devices are arranged on the other side and spaced apart by the punching interval along the path in the direction of travel. A pair of transistors are connected in a cross-coupled circuit and connected to the photoconductive devices. As the punched card or tape moves along the predetermined path, light from the lamp passing through an aperture in the card or tape indicative of data impinges on the first photoconductive device which is coupled to the cross-coupled circuit to switch it to a reciprocal stable state of operation. The switching is rapid as the resistive impedance of the photoconductive device falls, or the conductivity characteristic rises, rapidly in response to the application of light energy. Were the fall time of the conductivity characteristic of the photoconductive device as short as the rise time, the circuit would be restored to the initial stable state of equilibrium as rapidly and an electric output pulse would be produced as desired. According to the invention the desired effect obtains by connecting the other photoconductive device to the circuit to restore the same to the initial stable state of operation in response to light energy impinging on the second device through the same aperture in the carrier as it comes within the purview of the second photoconductive device. The duration of the data representing output pulse is proportional to the speed of the carrier and the spacing between the photoconductive devices. The maximum pulse width is obtained for a spacing equal to the punching interval.

Further, according to the invention, the sensing of apertures is enhanced by arranging the photoconductive devices to observe the same sensing area of the carrier and illuminating the first one by direct transmission of light from a lamp on the other side of the carrier through the aperture as it passes the sensing station and the second one by light from the same or another lamp reflected by the surface of the carrier between apertures. As the aperture comes within the purview of both photoconductive devices the first switches the pulse train generating circuit to the reciprocal stable condition as the second releases its holding due to the (now) absence of light. Preferably, a light absorbing surface is placed beyond the aperture with respect to the second photoconductive device in order to provide greater contrast in the reflected and non-reflected conditions of light propagation.

Still further according to the invention, both photoconductive devices are arranged on the same side of the card or tape as the lamp. The photoconductive devices are arranged through a suitable lens system to view successive areas of the card or tape. Again the placing of a light absorbing surface behind the aperture of the card or tape is preferred. Such an arrangement is equally adapted to sensing marks on the card or tape as well as apertures; the marks absorbing light in much the same manner as the aperture. Indeed the arrangement of this embodiment of the invention is such that either apertures or marks are sensed interchangeably; that is to say, that a card or tape having indicia in the form of both marks and apertures may be processed with equal facility.

In order that the full advantages of the invention obtain in practice, preferred embodiments thereof, given by way of example only, are described hereinafter with reference to the accompanying drawing, forming a part of the specification, and in which.

Figure 1:
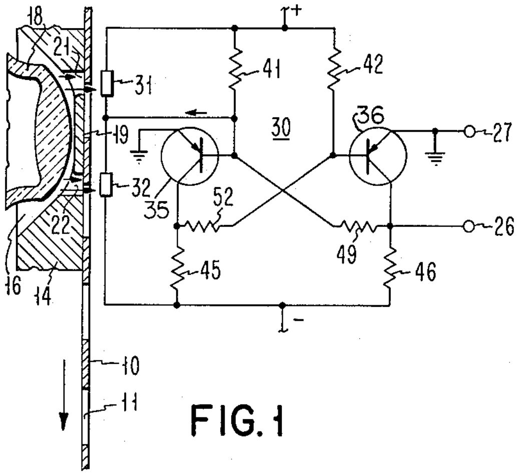
FIG. 1 is a schematic diagram of a photosensing arrangement according to the invention.

FIG. 1 schematically shows a propaedeutic embodiment of the invention for producing a train of electric pulses corresponding to information on a carrier 10 bearing indicia shown here as apertures 11. As shown, the carrier 10 is either a punched Hollerith card or a punched paper tape moved by conventional means (not shown) over a bed 14 having a bore 16 containing a source of light shown as only the tip of a lens-tipped electric incandescent lamp 18. Preferably, but not necessarily, a baffle member 19 is arranged to concentrate light from the lamp 18 through two bed apertures 21 and 22. The apertures 21 and 22 are spaced apart, preferably although not necessarily, by a distance equal to the punching interval of the apertures 11 in the carrier 10. That is to say, the bed apertures 21 and 22 are preferably arranged to be registered with two consecutive carrier apertures 11. The electric pulse train is obtained at a pair of output terminals 26, 27 of a bistable electric switching circuit 30 which is switched in response to light from the lamp 18 impinging on photoconductive devices 31 and 32 as described hereinafter.

The switching circuit 30 comprises two electron flow controlling devices shown here as PNP type transistors 35 and 36 in a base input circuit configuration. Positive energizing potential is applied between the terminals of bias resistors 41, 42 and a point of fixed reference potential, shown here as ground, to which the emitters of the transistors are fixed. Load resistors 45 and 46 are connected between the respective collector electrodes and a negative energizing potential supply. The transistors 35, 36 are cross-coupled by feedback resistors 49, 52 connecting the collectors of given transistors to the bases of the others. While PNP type transistors are given in the example it should be understood that it is clearly within the skill of the artisan to use NPN type transistors with corresponding reversal of the polarities of the energizing potential supplies.

It should be clearly understood that the photosensing arrangement according to the invention can be embodied with the more expensive conventional photoemissive devices such as photocells or solar cells and with the larger vacuum tube switching circuitry and therefore is not limited to photoconductive devices and transistor circuitry. The latter are shown and described herein because of the additional advantages of small size and low cost.

In operation the lamp 18 is lighted when the information processing machine is first energized and both photoconductive devices 31, 32 are illuminated since there is no punched card (or tape) on the bed and either of the transistors may be conducting, but the card feeding and the associated timing pulse generating or strobing arrangements are idle. The cards are now fed into the machine. As the leading edge of the first card progresses between the lamp 18 and the first or opening photoconductive device 31, only the closing photoconductive device 32 remains illuminated. This causes the circuit 30 to be switched to the initial state of conduction wherein the first or keying transistor 35 is cutoff and the other or switching transistor 36 is conducting. The impedance across the output terminals 26, 27 is low and the output voltage is close to zero with corresponding relatively heavy current flow. No change in the state of conduction takes place until an aperture is sensed by the opening photoconductive device 31 whereupon the switching circuit 30 is switched to the reciprocal state of conduction wherein the keying transistor 35 is conducting and the switching transistor 36 is cutoff, raising the impedance and the voltage across the output terminals 26, 27 and correspondingly lowering the current in the emitter-collector circuit. The subsequent illumination of the closing photoconductive device 32 by light directly transmitted from the lamp 18 through the same aperture 11 as the card progresses restores the circuit 30 to the initial tate of conduction and an information voltage or current pulse is completed at the output terminals 26, 27.

Figure 2:
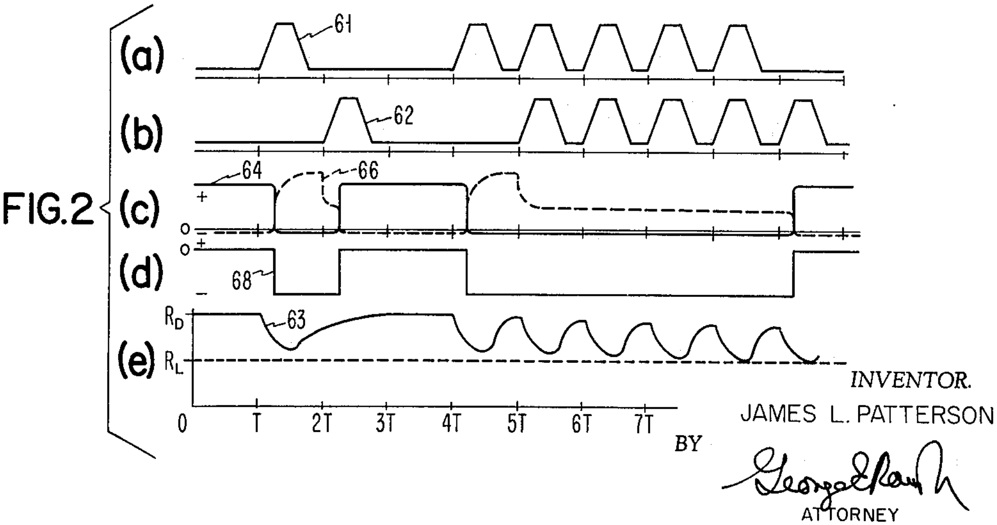
FIG. 2 is a graphical representation of the operation of the arrangement illustrated in FIG. 1.

FIG. 2 comprises a group of interrelated curves graphically illustrating on a common time base the operation of the photosensing arrangement described. The curves 61 and 62 represent the input of light to the opening and closing photoconductive devices 31 and 32 respectively as an aperture, two successive blanks, and five successive apertures are sensed. The curve 63 represents the resistance of the opening photoconductive device 31. The solid line curve 64 is a graphical representation of the voltage at the base of the keying transistor 35 while the dashed line curve 66 represents the current thereat. Curve 68 shows the corresponding voltage at the output terminals 26, 27.

It will be noted that the output wave 68 is of the non-return-to-zero (NRZ) type. It is considered an advantage of the invention that such a wave results, even for those times when a return-to-zero (RZ) type of wave is desired. Such is readily available by utilizing the conventional strobing arrangement to return the output wave to zero at the proper time. Such arrangements are well known and are omitted herein in the interest of clarity as they, in and of themselves, form no part of the invention.

Figure 3:
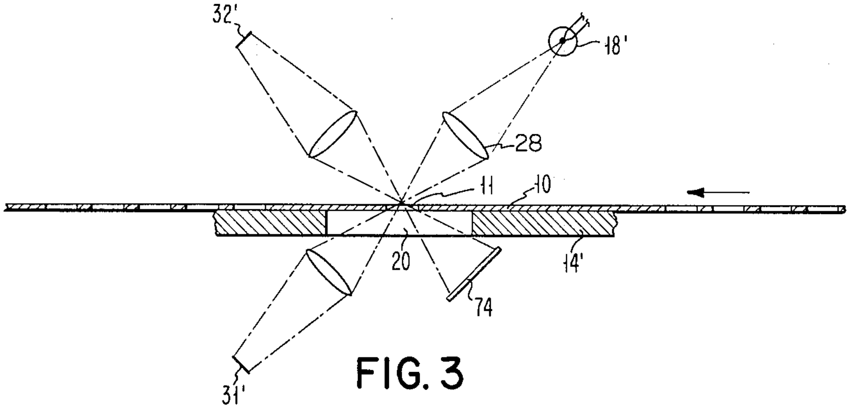

FIG. 3 shows a modification of the invention in which sensing takes place at a single point on the path of the carrier 10. Light from a lamp 18' is focused by an optical system shown only symbolically as a simple lens 28 at a point on the upper surface of the carrier 10 above the bore 20 in the bed 14'. An opening photoconductive device 31' is arranged to receive light by direct transmission through any aperture 11 as it passes the sensing point. The closing photoconductive device 32' receives light reflected by the upper surface of the card 10 in the absence of any aperture 11 and receives no light as an aperture passes the sensing point. The contrast is increased by placing a light absorbing mat surface element 74 in line behind the aperture 11.

Thus, the closing photoconductive device 32' is energized and holds the switching circuit 30 in the initial condition as a carrier is presented. As an aperture 11 comes into view the closing device 32' is de-energized and the opening photoconductive device 31' is energized to switch the circuit 30 to the reciprocal conductive condition generating an impulse at the output terminals 26, 27. As the aperture leaves the purview of the photoconductive devices the opening device 31' is de-energized and the closing device is again energized to generate an impulse in the opposite direction completing the information representing pulse at the output terminals 26, 27.

Figure 4:
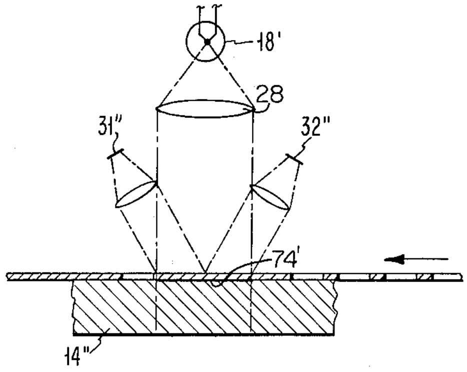
FIGS. 3 and 4 schematically illustrate variations of the arrangement according to the invention.

FIG. 4 shows still another embodiment wherein all of the electric elements are conveniently arranged at one side of the carrier 10 and indicia consisting of conventional marks can be sensed as well as apertures. Light from a lamp 18' is focussed on an area extending over approximately two indicia, apertures or marks for example. By suitable optical systems the two photoconductive devices 31'' and 32'' are focussed on adjacent areas of the carrier 10. A light absorbing mat surface 74' is preferably arranged in the bed 14'' of the machine which is preferably undercut slightly to prevent wear by the carrier (card or tape) passing over it. In the absence of any carrier, no light, or a minimum of light, impinges on either photoconductive devices 31'', 32'' and the circuit 30 is in the initial condition of conduction.

As a carrier is introduced reflected light impinges on the closing photoconductive device 32'' insuring that the switching circuit 30 is in the initial condition of conduction. As the carrier, say a punched card, progresses the opening photoconductive device also is energized but the switching circuit 30 remains in the initial condition since the closing photoconductive device 32'' is still energized. As an aperture approaches the first area, light normally reflected to the closing photoconductive device 32'' is absorbed from the system and only the opening photoconductive device 31'' is active, functioning to switch the circuit 30 to the reciprocal conductive condition and creating an impulse at the output terminals 26, 27 indicative of the sensing of indicia. As the card progresses the propagation of light from the lamp 18' to the photoconductive devices 31'', 32'' is reversed resulting in an impulse in the opposite direction at the output terminals 26, 27 completing the data pulse. Thus marks on or apertures in either cards or paper tape may be sensed interchangeably without changing the machine or the associated circuitry in any way once it is set up for operation.

The data below is offered, as a guide only, in the interest of enabling the artisan to practice the invention with the minimum of designing. These data are taken from a practical embodiment of the invention constructed along the lines of the circuitry shown in FIG. 1.

| Ref. No. | Component | Type or Value |
|---|---|---|
| 18 | Lens Tipped Lamp | GE 222. |
| 31 | Photoconductive Device | Cadmium-Selenide. |
| 32 | do | (0.010" x 0.125") overlay. |
| 35 | PNP Transistor | IBM 033. |
| 36 | do | IBM 033. |
| 41 | Return Resistor | 9.1 Kilohms. |
| 42 | do | 150 Kilohms. |
| 45 | Load Resistor | 0.75 Kilohms. |
| 46 | do | 1.6 Kilohms. |
| 49 | Coupling Resistor | 2.4 Kilohms. |
| 52 | do | 16 Kilohms. |

Two power supplies were used: (1) 12 volts D.C. between the positive point indicated by the plus (+) symbol and ground, and (2) 12 volts D.C .between the negative point indicated by the minus (−) symbol and ground.

The switching circuit 30 in the example given is unbalanced to match impedances between the photoconductive devices and the following associated transistor circuitry.

The curves in FIG. 2 were obtained in a sensing a conventional Hollerith card 0.0065 in. thick punched with apertures 0.125 in. width and spaced 0.125 in. a part; 0.055 in. deep in the direction of reading and spaced 0.087 in. on centers. Similar results were obtained with experimental cards having 0.030 in. by 0.045 in. apertures spaced 0.087 in. on centers.

While the the invention is particularly shown and described with reference to preferred embodiments, it should be clearly understood that those skilled in the art may make changes in form and details without departing from the spirit and scope of the invention.

The invention claimed is:

1. Photoelectric apparatus for sensing recorded information expressed in the form of the presence or absence of indicia borne by a moving carrier and for expressing such information as sensed in the form of an electric pulse wave, comprising a source of light arranged at one side of said carrier to illuminate the same at a single sensing station, a pair of photoresponsive devices arranged at a side of said carrier at said single sensing station for receiving light as propagated by said carrier in the presence and in the absence of an indicium, and a bistable electric pulse generating circuit having one of said photoresponsive devices connected thereto for producing an electric output current of one nature in response to illumination of said one photoresponsive device and having the other photoresponsive device connected thereto for producing an electric output current of different nature in response to illumination of said other device.

2. Photoelectric apparatus for sensing recorded information expressed in the form of the presence or absence of apertures in a moving carrier and for expressing such information as sensed in the form of an electric pulse wave, comprising a source of light arranged at one side of said carrier to illuminate the same at a single sensing station, a pair of photoconductive devices arranged at the same side of said carrier at said single sensing station for receiving light as reflected by said carrier in the presence and in the absence of an aperture, and a bistable electric pulse generating circuit having one of said photoconductive devices connected thereto for producing an electric output current of one nature in response to illumination of said one photoresponsive device and having the other photoresponsive device connected thereto for producing an electric output current of different nature in response to illumination of said other device.

3. Photoelectric apparatus for sensing recorded information expressed in the form of the presence or absence of marks on a moving carrier and for expressing such information as sensed in the form of an electric pulse wave, comprising a source of light arranged at one side of said carrier to illuminate the same at a single sensing station, a pair of photoconductive devices arranged at the same side of said carrier at said single sensing station for receiving light as reflected by said carrier in the presence and in the absence of one of said marks, and a bistable electric pulse generating circuit having one of said photoconductive devices connected thereto for producing an electric output current of one nature in response to illumination of said one photoconductive device and having the other photoconductive device connected thereto for producing an electric output current of different nature in response to illumination of said other device.

4. Photoelectric sensing apparatus comprising a sensing station having means to move a carrier bearing indicia representative of binary coded information past said station in a predetermined path, means arranged on one side of the path of said carrier to illuminate the indicia, and a pair of photoconductive devices arranged with respect to the path of said carrier to intercept light from said illuminating means by way of said indicia, said photoconductive devices being spaced apart along said path in the direction of travel of the punched card by a distance substantially equal to the interval of punching of the card, and a bistable switching circuit for generating an electric pulse train representative of the indicia borne by the carrier moving past said station including a pair of cross-coupled transistors arranged in said circuit with one transistor initially conducting and the other initially cut off, means coupling the first of said photoconductive devices to sense an indicium in the carrier passing said station in said circuit for reversing the states of conduction of said transistors, and means coupling the other of said photoconductive devices in said circuit to sense the same indicium for restoring the initial states of conduction of said transistors, thereby producing an output electric pulse representative of said indicium.

5. Punched card sensing apparatus comprising, a sensing station having means to move a punched card past said station in a predetermined path, means arranged on one side of the path of said punched card to illuminate the apertures in the punched card, and a pair of photoconductive devices arranged on the other side of the path of said punched card to intercept light from said illuminating means, said photoconductive devices being spaced apart along said path in the direction of travel of the punched card by a distance substantially equal to the interval of punching of the card, and a bistable switching circuit for generating an electric pulse train representative of the punching in the card moving past said station including a pair of cross-coupled transistors arranged in said circuit with one transistor initially conducting and the other initially cut off, means coupling the first of said photoconductive devices to sense an aperture in the card passing said station in said circuit for reversing the states of conduction of said transistors, and means coupling the other of said photoconductive devices in said circuit to sense the same aperture for restoring the initial states of conduction of said transistors, thereby producing an output electric pulse representative of the presence of said aperture.

6. Marked carrier sensing apparatus comprising a sensing station having means to move a marked carrier past said station in a predetermined path, means arranged on one side of the path of said marked carrier to illuminate the marks on the carrier, and a pair of photoconductive devices arranged on the same side of the path of said marked carrier to intercept light from said illuminating means by reflection from said carrier in the absence of said marks, said photoconductive devices being arranged along said path in the direction of travel of the carrier by a distance equal to the interval of marking of the carrier, and a bistable switching circuit for generating an electric pulse train representative of the marking of the carrier moving past said station including a pair of cross-coupled transistors arranged in said circuit with one transistor normally conducting and the other normally cut off, means coupling the first of said photoconductive devices to sense a mark on the carrier passing said station in said circuit for reversing the states of conduction of said transistors, and means coupling the other of said photoconductive devices to sense the same mark on the carrier passing said station in said circuit for restoring the normal states of conduction of said transistors.

7. An information bearing electric wave generator comprising a pair of transistors having base, emitter and collector electrodes, a pair of series circuits comprising a resistor, the base-collector path of one of said transistors, and another resistor, means for applying direct energizing potential across said series circuits, means fixing the emitter electrodes at a reference potential intermediate of said energizing potential, a pair of resistors cross-coupling the base electrode of each of said transistors to the collector electrode of the other, a pair of photoconductive devices connected in series with means for applying the energizing potential to said photoconductive devices, the junction of said photoconductive devices connected to the base electrode of one of said transistors, and means for extracting an output electric wave between the collector electrode of one of said transistors and a point of said reference potential.

8. An information bearing electric wave generator comprising a pair of transistors having base, emitter and collector electrodes, a pair of series circuits comprising a resistor, the base-collector path of one of said transistors, and another resistor, means for applying direct energizing potential across said series circuits, means fixing the emitter electrodes at a reference potential intermediate of said energizing potential, a pair of resistors cross-coupling the base electrode of each of said transistors to the collector electrode of the other, a pair of photoconductive devices connected in series across said energizing potential applying means, means connecting the junction of said photoconductive devices to the base electrode of one of said transistors, and means for extracting an output electric wave between the collector electrode of one of said transistors and said point of reference potential.

References Cited by the Examiner

UNITED STATES PATENTS

| | | | |
|---|---|---|---|
| 2,941,086 | 6/1960 | Gottschall et al. | 250—237 X |
| 2,994,783 | 8/1961 | Looschen | 250—209 X |
| 3,005,915 | 10/1961 | White et al. | 250—214 |
| 3,008,126 | 11/1961 | Estrems | 307—88.5 |
| 3,026,419 | 3/1962 | Aweida et al. | 250—219.4 |
| 3,031,587 | 4/1962 | Ord et al. | 307—88.5 |
| 3,061,732 | 10/1962 | Milnes | 250—209 X |

RALPH G. NILSON, *Primary Examiner.*

WALTER STOLWEIN, *Assistant Examiner.*